(12) United States Patent
Grafen et al.

(10) Patent No.: US 6,852,220 B1
(45) Date of Patent: Feb. 8, 2005

(54) FILTER PLATE OF A FILTER PRESS

(75) Inventors: Karl Grafen, Wuerselen (DE); Hermann-Josef Spoelgen, Langerwehe (DE)

(73) Assignee: Outokumpu Oyj, Espoo (FI)

( * ) Notice: Subject to any disclaimer, the term of this patent is extended or adjusted under 35 U.S.C. 154(b) by 35 days.

(21) Appl. No.: 10/130,956

(22) PCT Filed: Nov. 8, 2000

(86) PCT No.: PCT/EP00/11012
§ 371 (c)(1), (2), (4) Date: May 22, 2002

(87) PCT Pub. No.: WO01/37964
PCT Pub. Date: May 31, 2001

(30) Foreign Application Priority Data

Nov. 25, 1999 (DE) .......................................... 199 56 617

(51) Int. Cl.[7] ............................................ B01D 25/168
(52) U.S. Cl. ...................... 210/229; 210/230; 210/231; 210/350; 210/456; 100/197; 100/211
(58) Field of Search ................................. 210/224, 231, 210/227–229, 350, 456, 230; 100/197, 211

(56) References Cited

U.S. PATENT DOCUMENTS

| | | | | |
|---|---|---|---|---|
| 2,383,868 A | * | 8/1945 | Kraus | ........................... 210/228 |
| 4,219,425 A | * | 8/1980 | Yoshida | ........................ 210/225 |
| 5,445,733 A | | 8/1995 | Van Egdon et al. | |

FOREIGN PATENT DOCUMENTS

| | | | | |
|---|---|---|---|---|
| DE | 99530 | | 2/1898 | |
| DE | 2920064 | | 11/1980 | |
| DE | 19546701 | | 6/1996 | |
| DE | 19745289 | | 12/1998 | |
| EP | 0540705 | | 1/1995 | |
| EP | 0852962 | | 7/1998 | |
| FR | 1593016 A | * | 7/1970 | ................. 210/230 |
| GB | 645586 | | 11/1950 | |
| JP | 62155909 | | 7/1987 | |
| JP | 63-221814 | * | 9/1988 | ................. 210/231 |
| JP | 4-11907 | * | 1/1992 | ................. 210/231 |

* cited by examiner

Primary Examiner—Matthew O. Savage
(74) Attorney, Agent, or Firm—W. F. Fasse; W. G. Fasse

(57) ABSTRACT

A filter press for filtering suspensions includes plural parallel filter plates that can be displaced relative to one another. In a filtering position, the filter plates are compressed to a package that forms a filter chamber provided with at least one filter cloth between neighboring filter plates. In a discharge position, neighboring filter plates are moved apart by a discharge distance so that a filter cake adhering to the filter cloth can be discharged. Every filter chamber is provided with at least one filling element for feeding the suspension to the filter chamber. The filling element is disposed on a protruding part that protrudes beyond a plate body face or contour and within a sealing edge on the periphery of the filter plates. In the filtering position, the filling elements are sealingly clamped between neighboring filter plates and form a suspension supply channel that extends through the filter plate package.

9 Claims, 6 Drawing Sheets

FILTER PLATE OF A FILTER PRESS

FIELD OF THE INVENTION

The invention relates to a filter plate of a filter press for filtering suspensions, in which a plurality of filter plates arranged so as to be displaceable parallel to each other are compressible to form a package in a filtration position, which package comprises between each pair of filter plates a filter chamber provided with at least one filter cloth and in which the filter plates are able to be spaced apart from each other up to an emptying distance in a discharge position, with at least one filling element for supplying suspension to the filter chamber is associated with each filter chamber.

BACKGROUND INFORMATION

A filter press comprising such filter plates is known, for example, from EP 0 540 705 B1. Here, the filling elements are formed as rod-shaped tube bodies laid in a sealing manner into a groove-shaped recess of the sealing edge, which recess extends at the edge in the direction of said sealing edge. A sealing edge extends between said recess and said filter chamber which sealing edge is provided with transversal openings arranged transversely to its extension and corresponding with pulp exit openings of the tube body. In this way, a flow connection is produced between the tube body and the filter chamber.

Such filling elements are especially advantageous if an endless filter tape extending in a zig-zag shape around the filter plates is to be used. It is, however, a disadvantage of this design that the filling elements penetrate the sealing edge of the filter chambers and thus may, especially in the case of high pressures, cause sealing problems. Furthermore, a separate supply line for the supply of suspension outside the filter plate package as well as a plurality of connection lines between the supply line and the filling elements are required. Finally, special provisions are to be made for supporting the filling elements arranged approximately in the center of the intermediate space between two filter plates after these have been spaced apart to their emptying distance.

An alternative way of supplying the suspension is a so-called central pulp inlet arranged in a central position within the plate face and formed by a number of passage openings in the filter plates corresponding with the number of individual filter plates. In the filtration position of the filter plate package, the passage openings are composed to form a central inlet channel sealed at the joining points from which channel the pulp can enter the individual filter chambers.

It is a disadvantage of this design that the effective filter area and the chamber volume are reduced by the passage bores in the filter plates and that in the case of deformations of the filter plates due to an uneven pressure exerted on them the inlet cross-sections of the individual chambers are altered which may cause even larger differences in the pressure level of adjacent chambers.

Furthermore, so called corner inlets are generally known as another type of feeding suspension. Here, the corner portions of the filter plates are provided with passage openings flush to each other which in a compressed state of the package form a pulp channel extending near the corners and arranged inside the sealing edge of the filter plate. It is an advantage compared to a central pulp inlet that the diaphragm movement is affected neither by supporting toes nor by the central diaphragm clamps in the inlet area. Also, the suspension feeding cross-section cannot change due to plate deformation which means a more even filling and a more even pressure generation than in the case of a central inlet.

It is a disadvantage of the corner inlet that the filter cloths have to be fixed to the filter plates by clamps, for example by means of screwable clamp rings in the inlet area. On the one hand, this means a comparatively high working effort when replacing the filter cloths. On the other hand, such a fixation of the filter cloths on the filter plate excludes the possibility of cleaning a filter cloth by means of a movable pair of rollers around which the filter cloth runs in an S-shaped manner. Such a possibility of filter cake removal is known from DE 195 46 701 A1 and DE 197 45 289 C1.

SUMMARY OF THE INVENTION

It is an object of the present invention to provide a filter plate whose filling device does not penetrate the sensitive region of the sealing edge and which is arranged outside the actual filter face and enables without clamp rings the sealing of a filter cloth sitting loosely on the filter plate in the compressed state of the package. Supply lines and branching connection lines extending outside the filter plates shall be omitted.

Based on a filter plate of the type described above, this object is achieved in accordance with the invention in such a way that the filling element is mounted on a joining piece extending outside a plate face and inside a sealing edge extending circumferentially around the filter plates and that said filling element is able to be connected with a filter plate, with the filling elements forming in the filtration position a suspension inlet channel extending through the filter plate package and being sealingly clamped between adjacent filter plates.

The design of the filling elements according to the present invention provides the preconditions for the highest possible filtration capacities as the actual plate face is kept free from any fittings for suspension feeding. As the filling elements are arranged completely inside the circumferential sealing edge, there is no risk of leakage even in the case of high chamber pressures. As the filling elements co-operate to form an inlet channel inside the plate package, separate supply lines extending outside of and parallel to the plate package as well as branching connection lines to the individual filter chambers are unnecessary. Thus, the filter presses in which the filter plates according to the present invention are used can be manufactured at low cost and furthermore are low-maintenance and low-wear units.

Similar to a corner inlet and due to their unaltered inlet cross-section, the filling elements of the filter plate according to the present invention also provide a very even pressure generation in the filter chambers and thus minimize the risk of a stronger deflection of the filter plate face.

Furthermore, at least one filter cloth can be sealingly clamped between the filter plate and the filling element without being fixed to the filter plate so that after spacing apart adjacent filter plates to their emptying distance a cake discharge device equipped with a pair of rollers can pass over the filter cloth over the entire plate face which is necessary to completely remove the filter cake.

Provided that the filter plate package is composed of alternately arranged so-called diaphragm plates having a diaphragm on each side and so-called chamber plates without diaphragms, preferably the diaphragm plates comprise on each opposite side one filling element each which sealingly penetrates the filter cloth arranged so as to face the diaphragm plate side.

According to one embodiment of the filter plate, it is provided that the filling element consists of a cylindrically shaped central part forming the inlet channel and a flange part extending rectangularly to the longitudinal axis of the former and being provided with branch channels extending radially from the inlet channel and leading into the filter chamber. It is possible that the flange part at least partially engages a recess in the filter plate to which it is connectable as well as a recess in the opposite filter plate.

If the flange part is embedded at its whole thickness into the chamber plate, the diaphragm will be of a much simpler design.

As a further development of the present invention, it is suggested to provide a receiving bore for the filling element in the filter plate with a groove corresponding with a groove formed in the filling element in its inserted state, with a sealing ring being inserted in one of said grooves to positively connect the filling element with the filter plate.

In such a design, the sealing ring has a double function in that on the one hand it prevents the entry of suspensions into regions behind the filter cloth of the diaphragm plate and on the other hand provides a positive connection of the filling element with the filter plate, with this connection being releasable without using any tools (snap lock) due to the elasticity of the preferably rubber-like sealing ring. Compared to screwed clamp rings for the filter cloths, a replacement is possible here within a considerably shorter period of time.

Furthermore, due to the chemical stability, no special materials are required for a screwed connection.

If a front side of the flange part facing the filter chamber extends in such an inclined manner that the diaphragm in its inflated state is consistently supported by it, the risk of overstressing the diaphragm material which would occur in the case of uneven transitions with sharp edges is excluded.

Furthermore, it is suggested to provide the filter plate with which the filling element is not connected with a groove surrounding a passage bore into which groove a sealing ring can be inserted against which the flange part can be pressed in the filtration position.

Such a sealing ring also allows sealing a filter cloth to sit close to a chamber plate without being fixed to it between this plate and the opposite facing surface of the filling element. This prevents the suspension from ingressing from the feeding channel into regions between the filter cloth and the chamber plate.

In another embodiment of the present invention, the central part is located outside the diaphragm and the filter plate is provided with a sleeve surrounding the passage bore, which sleeve is elastically compressible by the flange part of the filling element in the filtration position of the plate package.

As it is unnecessary in this design that the diaphragm be penetrated by the central part of the filling element, the diaphragm can be manufactured simpler and thus at less cost. The sleeve, which is preferably compressible like elastic rubber, provides a secure support of the filling element in the filtration position.

Finally, it is suggested that a sealing bead of the diaphragm is also elastically compressible by the flange part of the filling element in the filtration position of the plate package. Thus, a secure sealing of the diaphragm towards the base plate body can be achieved also in the area of the filling element.

BRIEF DESCRIPTION OF THE DRAWINGS

The present invention will now be described in more detail with reference to the embodiments of the filter plate according to the present invention, wherein.

DETAILED DESCRIPTION OF PREFERRED EXAMPLE EMBODIMENTS AND THE BEST MODE OF THE INVENTION

Figure 1:
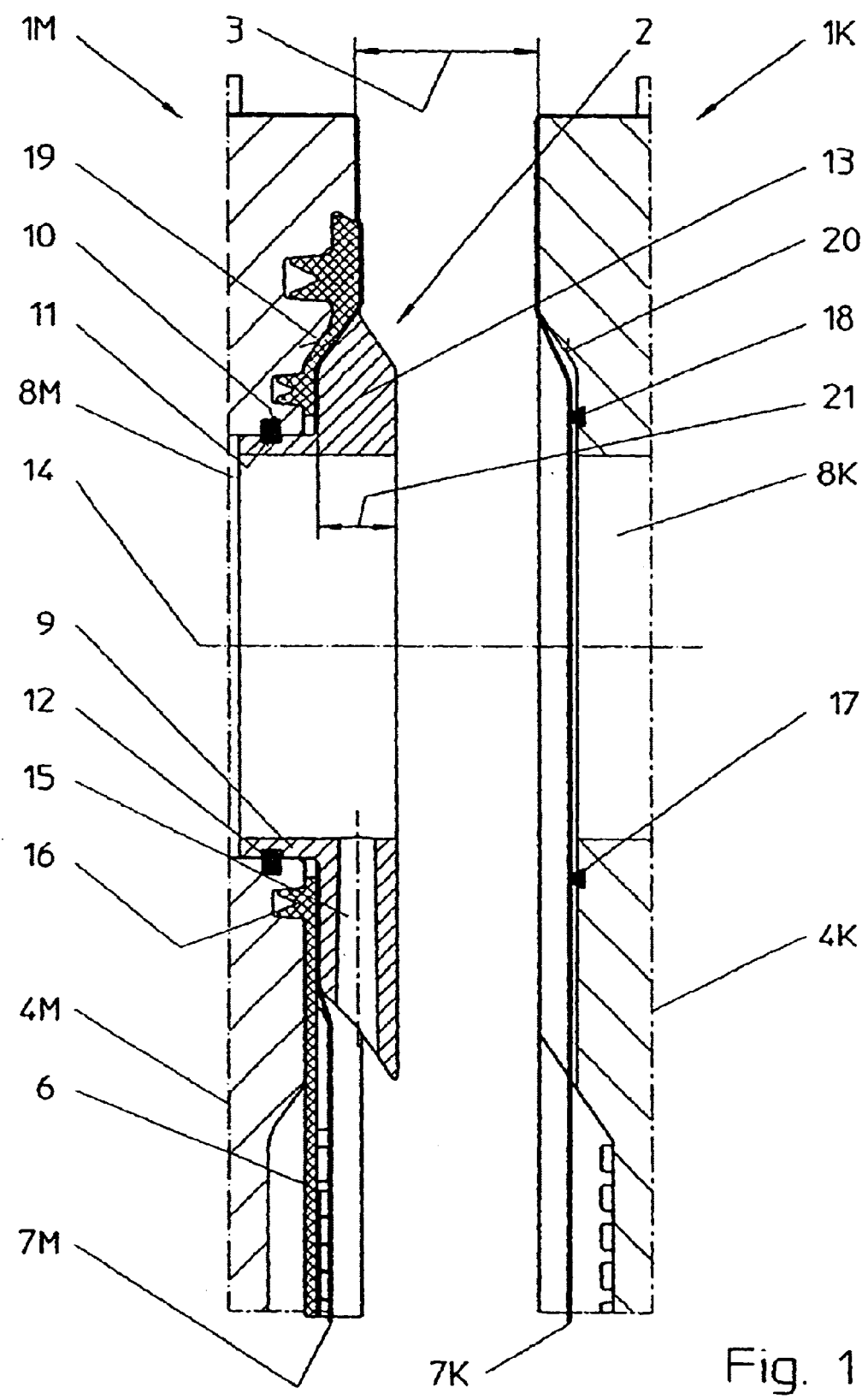
FIG. 1 shows the right half of a first embodiment of a diaphragm plate with the filling element inserted and the left half of a chamber plate spaced apart from the former, in a longitudinal section of an upper portion of said plates.

In the left partial figure, FIG. 1 shows as a longitudinal section the right half of a filter plate formed as diaphragm plate 1M in the zone of a filling element 2 inserted therein. The right partial figure of FIG. 1 shows the left half of a chamber plate 1K spaced apart from said diaphragm plate 1M by an emptying distance 3. The diaphragm plate 1M as well as the chamber plate 1K are formed symmetrically with respect to their planes of symmetry 4M and 4K, respectively. For reasons of simplicity, the mutually averted identical opposite halves of the two illustrated filter plate portions are not shown. Furthermore, the longitudinal sections illustrated in FIG. 1 show only the uppermost portion of the vertically aligned filter plates 1M and 1K in the region of a joining piece 5 extending above a plate edge 5' which upwardly limits an essentially rectangular plate face of the filter plate 1M.

In a filter press not shown in its entirety, a plurality of filter plates 1M and 1K are arranged sequentially in the form of a package of plates being horizontally displaceable relative to each other, in which sequence each diaphragm plate 1M provided with a diaphragm 6 and a filter cloth 7M on each side is followed by a chamber plate 1K provided only with a filter cloth 7K on both sides (and no diaphragm).

A cylindrically shaped central part 9 of the filling element 2 is inserted into a receiving through-bore 8M in the diaphragm plate 1M. In order to achieve a positive interlock between the filling element 2 and the diaphragm plate 1M, both aforementioned components are provided with a mutually corresponding groove 10 and 11 wherein a rubber-elastic sealing ring 12 has been inserted into the deeper groove 10 in the diaphragm plate 1M prior to mounting the filling element 2, the projecting portion of which ring engages—similar to a snap lock—the shallower groove 11 in the filling element 2 as soon as this element has reached its end position.

The filling element 2 further comprises a flange part 13 aligned at a right angle relative to the longitudinal axis of the central part 9, which flange part is provided with several branching channels 15 radially extending from the longitudinal axis 14 of the central part 9.

The filter cloth 7M, provided with a hole in the region of the filling element 2, as well as the diaphragm 6, also provided with a comparable hole, are fixed onto the diaphragm plate 1M by means of the flange part 13. The hole in the diaphragm 6 is limited by a circumferential sealing bead 16 engaging a properly adapted groove.

The chamber plate 1K is provided with an undercut groove 17 surrounding the passage bore 8K in which groove a sealing ring 18 is laid in. The filter cloth 7K, which in the area of the passage bore 8K is also provided with a properly adapted hole (of a slightly larger diameter), rests on said sealing ring.

The diaphragm plate 1M as well as the chamber plate 1K are each provided with a trough-shaped recess 19, 20 in regions around the receiving or passage bores 8M, 8K, which recesses are preferably of the same depth and in sum correspond with the thickness 21 of the flange part 13.

Figure 2:
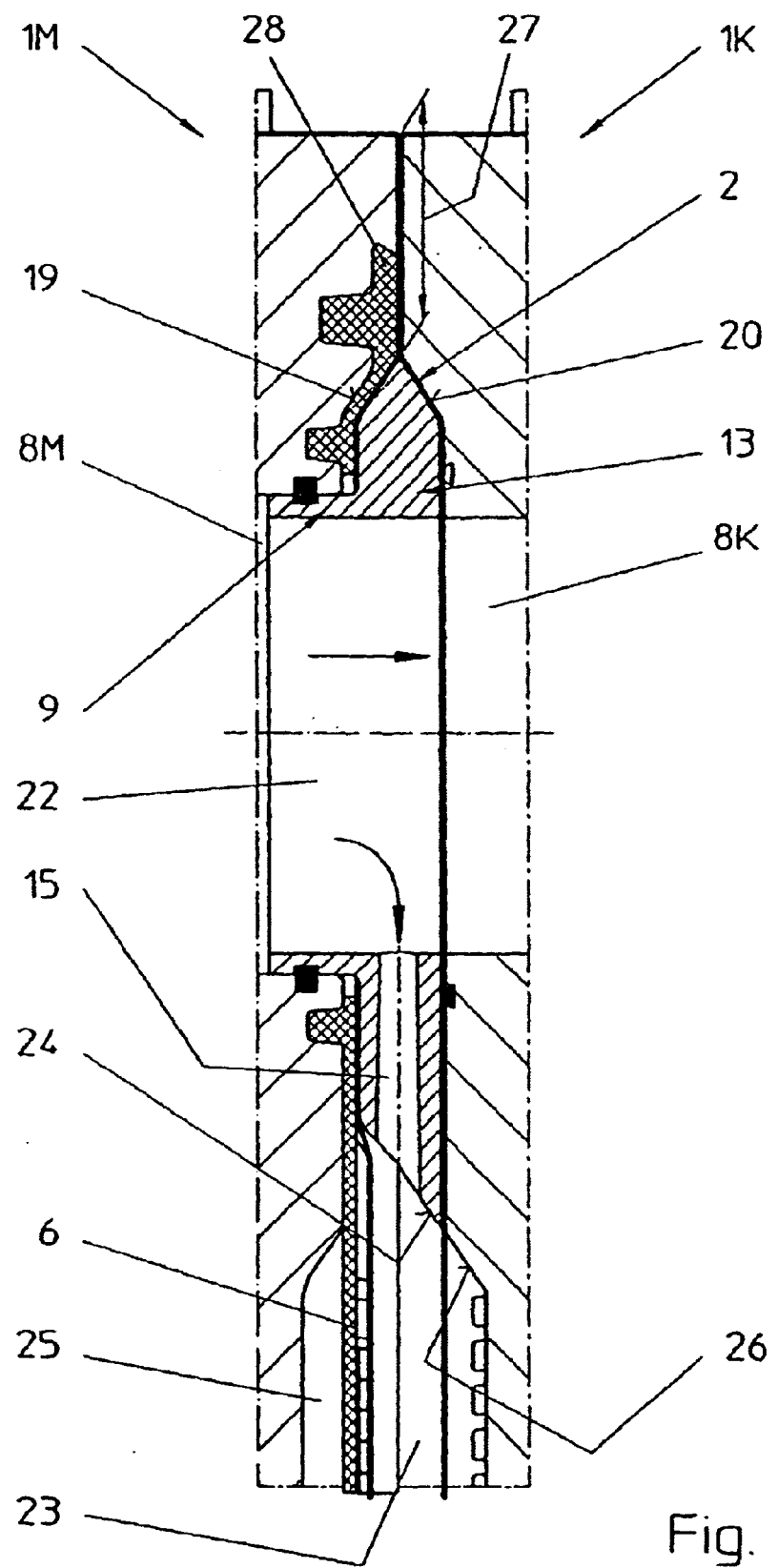
FIG. 2 shows a view similar to FIG. 1 but with both filter plates being pressed against one another.

It is clear from FIG. 2 how the flange part 13 of the filling element 2 is completely received by the two recesses 19 and 20 when the two filter plates 1M and 1K in the filtration position shown in this Figure are pressed against one another for example by a hydraulic closing means. The receiving bore 8M in the diaphragm plate 1M coaxially aligned with the passage bore 8K in the chamber plate 1K forms, together with the filling element 2 inserted in the former and/or its central part 9, a continuous inlet channel passage 22 from which the branching channels 15 extend to lead into a respective filter chamber 23 formed between a diaphragm plate 1M and a chamber plate 1K.

As can be seen in FIG. 2, a lower front side 24 of the flange part 13 of the filling element 2 facing the filter chamber 23 is formed in an inclined manner so that the diaphragm 6 in its inflated state, in which it is displaced to the right due to feeding a pressure medium into a pressure medium space, is supported steadily and without sharp-edged alterations in direction. The inclination of the front side 24 is equal to the inclination of a surface portion 26 of the chamber plate 1K.

Furthermore, it becomes clear from FIG. 2 that the filling element 2 fully extends inside a sealing edge 27 formed on the diaphragm plate side by a rubber-elastic bead 28 of the diaphragm 6 which bead projects in the emptying position over the plate surface. However, the filling element is arranged completely outside the actual plate face so that no effective filter surface is lost, as a result of which a higher filtration capacity is achieved.

It is clear from the emptying position of the adjacent filter plates 1M and 1K as shown in FIG. 1 that the filter cloth 7K of the chamber plate 1K is secured only on the upper plate edge to the chamber plate 1K so as to be freely liftable from the filter plate in the region of the pulp channel as well as in the region of the filter plate face lying underneath. For this reason, a cake discharge apparatus in the form of a pair of rollers which are vertically movable between the adjacent filter plates 1M and 1K and around which the filter cloth 7K is laid in an S-shaped manner can easily be moved up to the region of the joining piece 5 so that the filter cloth 7K is bent around a sharp edge over the entire area of the plate face to achieve a complete stripping-off of the filter cake. The filter cloth 7M of the diaphragm plate 1M is not bent in an S-shaped manner by such a pair of rollers as experience has shown that the filter cake adheres almost exclusively onto the filter cloth 7K associated with the chamber plate 1K. Thus, a clamping fixation of the filter cloth 7M by means of the filling element 2 does not entail any disadvantages.

Figure 3:
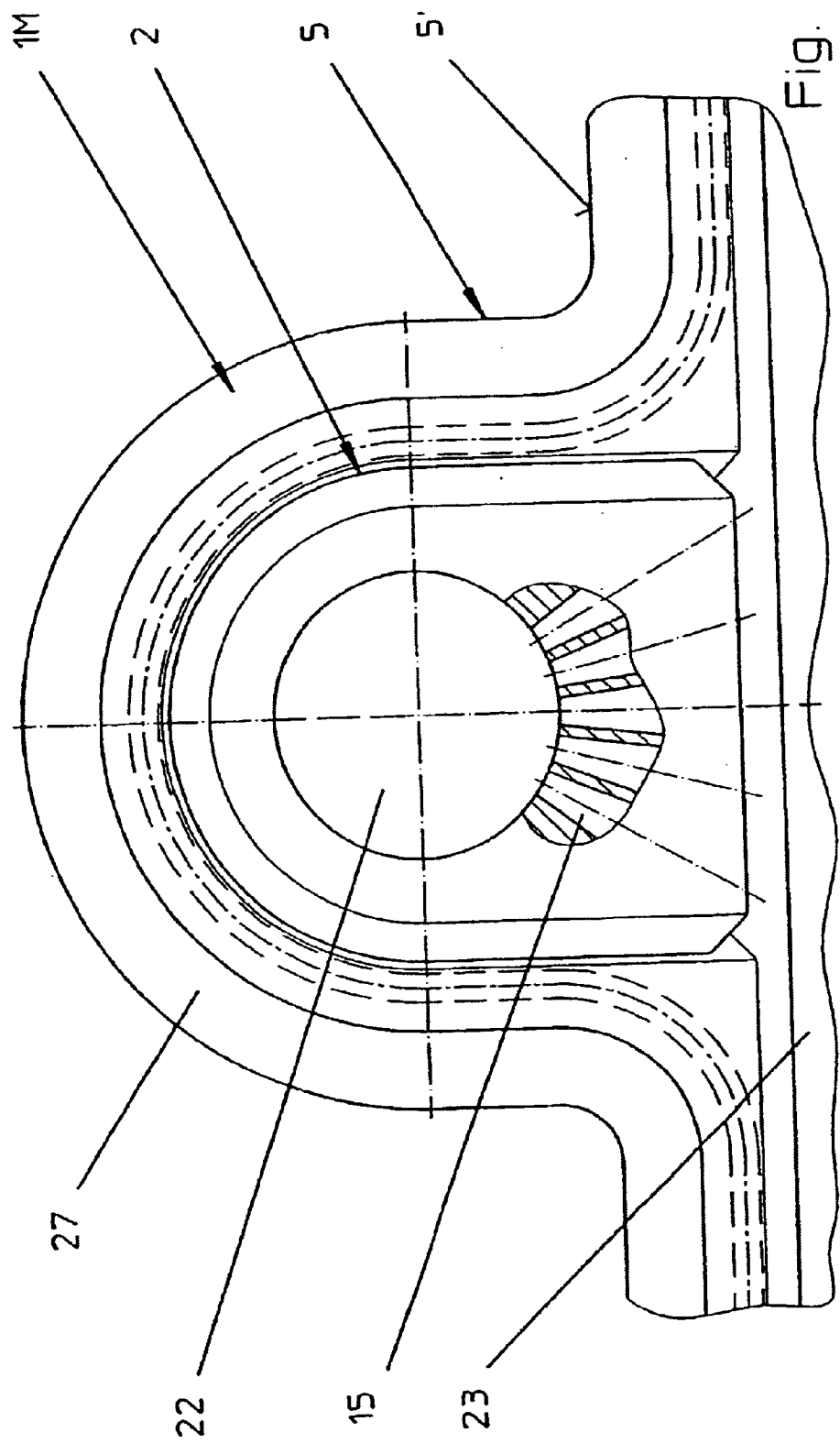
FIG. 3 shows a partial front view of the diaphragm plate with the filling element inserted.
Figure 4:
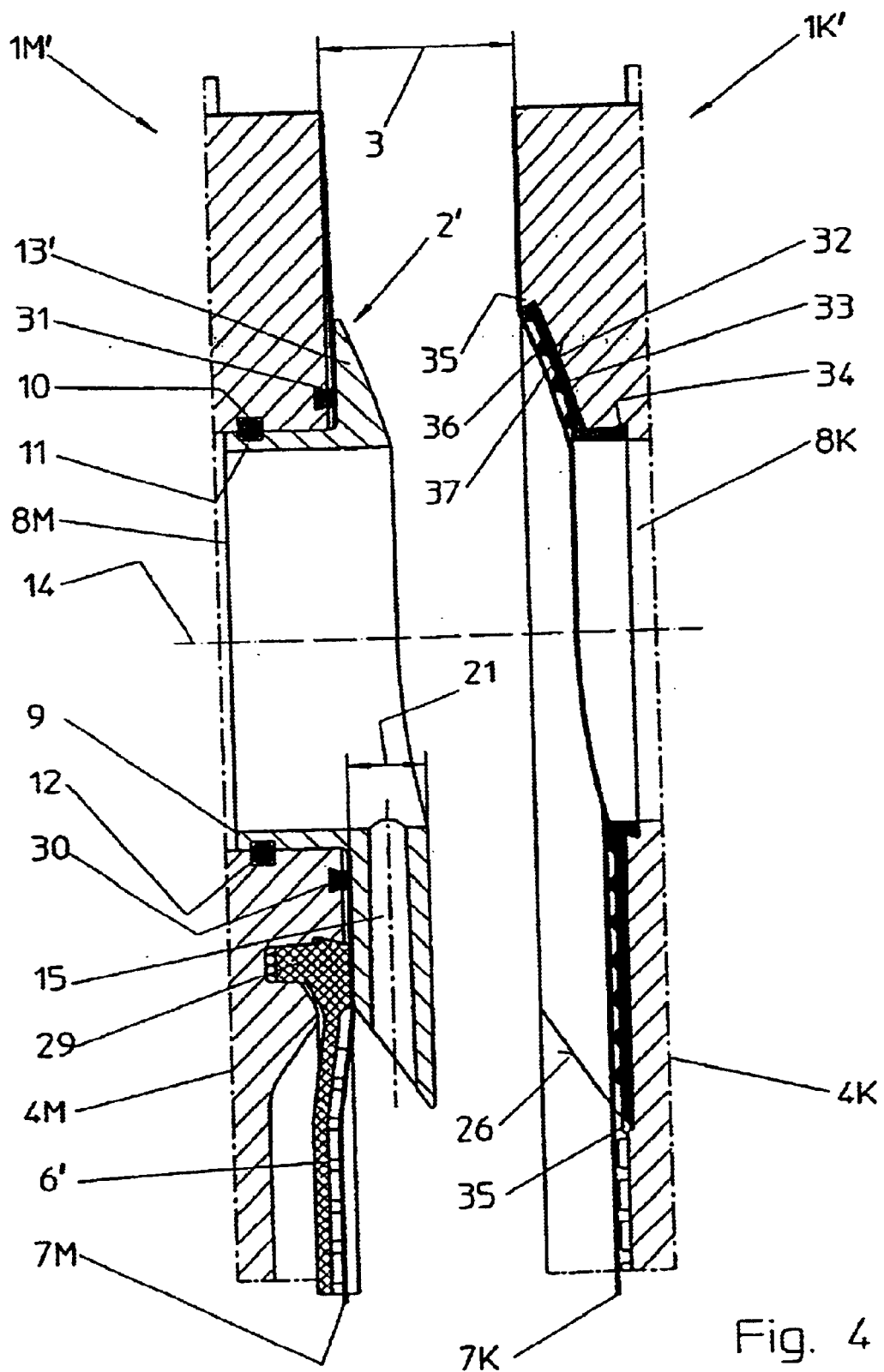
FIG. 4 shows a view similar to FIG. 1 but with a filling element arranged in an alternative manner.

FIG. 4 shows another embodiment of the design shown in FIGS. 1 through 3 as an alternative suggestion.

In the embodiment shown in FIG. 4, the diaphragm 6' is formed so as to no longer enclose the filling element 2 to allow simpler and more cost-efficient manufacturing.

An outer edge of the diaphragm 6' formed as a sealing bead 29 extends below the receiving bore 8M where it engages fully in an adapted groove in the base body of the plate.

Instead of the sealing bead 16 (FIG. 1), which is no longer present, the hole in the filter cloth 7M is sealed by a circumferential sealing ring 30 laid into an undercut groove 31.

The chamber plate 1K' is provided with a trough-shaped recess 32 in the region around the receiving bore 8K into which recess an elastic sleeve 33 (preferably made of rubber) is laid in a positive-locked way. The depth of the recess 32 is dimensioned so that the thickness 21 of the flange part 13' can preferably and completely be received by the chamber plate 1K'.

The sleeve 33 is fixed inside the chamber plate 1K' in the region of the passage bore 8K by a circumferential bead 34 and on the outer edge by an undercut 35.

On the side facing the filling element 2' the sleeve 33 is formed with prism-shaped sealing ridges 36.

The height of the sealing ridges 36 is dimensioned so that the sleeve 33 elastically chucks the filling element 2' when the filter plate package is compressed, whereby possible manufacturing tolerances at the chucking location are compensated.

The occurring deformation of the sealing ridge 36 is compensated by laterally displacing the elastic material in the region of the deeper grooves 37.

This embodiment ensures a secure sealing towards the filter cloth 7K as well as an elastic support of the filling elements 2' in the region of the chucking location.

Figure 5:
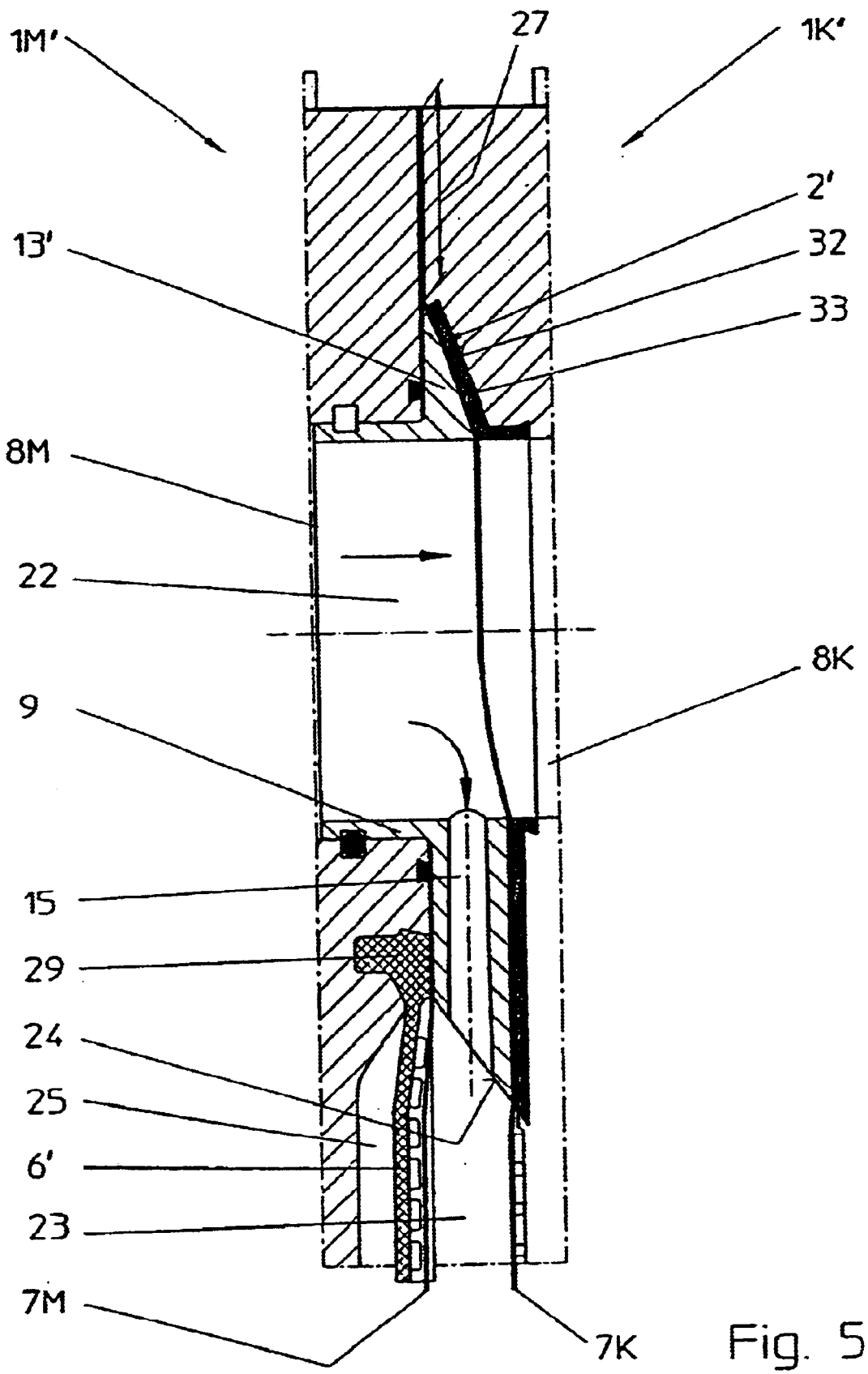
FIG. 5 shows a view similar to FIG. 4 but with both filter plates being pressed against one another.

It becomes clear from FIG. 5 how in the second embodiment the flange part 13' of the filling element 2 is fully received by the recess 32 of the chamber plate 1K' when the two adjacent filter plates 1M' and 1K' are pressed against one another in the filtration position illustrated here.

It furthermore becomes clear that the sealing ridges 36 of the sleeve 33 have nearly completely deformed and in this state exert an elastic pretension onto the filling element 2'.

It can further be seen in FIG. 5 that in this embodiment, too, the filling element 2' extends completely inside the sealing edge 27.

The diaphragm bead 28, no longer present in this region of the diaphragm plate side (FIG. 2), has no disadvantageous effect as the filter cloths 7M and 7K clamped in the sealing edge 27 provide for a sufficient sealing function towards the outer side of the plate.

In this embodiment, the pressure medium space 25 is sealed by the circumferential outer edge of the diaphragm 6' formed as a sealing bead 29 which in the non-pressed state projects from the plate plane by approx. 1–3 mm.

All other features of the first embodiment described in FIGS. 1 through 3 are maintained in the alternative version shown in FIGS. 4 and 5.

Figure 6:
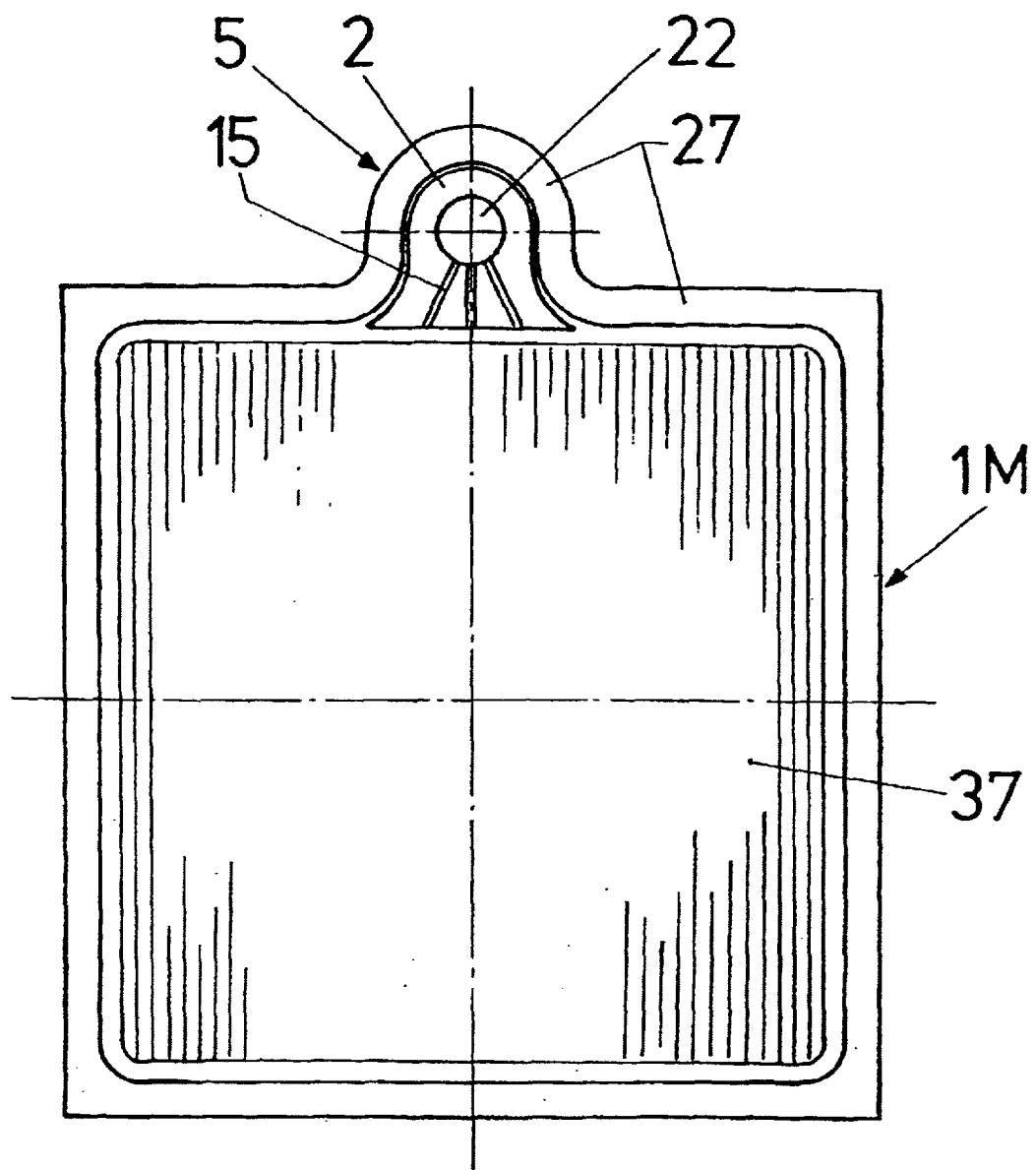
FIG. 6 shows a front view of a diaphragm plate.

FIG. 6 shows a front view of the diaphragm plate 1M which in contrast with the illustration in FIG. 3 is shown in its entirety. It can be seen that the filling element 2 is arranged inside the circumferential sealing edge 27, but outside the actual plate face 37 which is used as the active filter surface marked by vertical lines in FIG. 6. The displacement of the filling element 2 to the outside of the plate face is made possible by the joining piece 5 which projects in an ear-like shape from the otherwise rectangular base surface of the plate. The plate sealing edge extends even in the region of the joining piece 5 on the outer edge of the diaphragm plate 1M to embrace or surround the filling element 2 from the top and lateral directions. When the filter plate package is closed, the passage bores 8M and 8K in the filter plates 1M and 1K form a closed continuous inlet channel passage 22 through which the individual filter chambers 23 can be filled with suspension by means of the filling elements 2 via the branching channels 15. As mentioned above, a filter plate package consists of alternating diaphragm plates 1M and chamber plates 1K.

What is claimed is:

1. A filter plate arrangement of a filter press for filtering suspensions comprising a plurality of filter plates arranged so as to be displaceable parallel to each other and to be compressible to form a plate package in a filtration position, which package comprises between each pair of two adjacent ones of the filter plates a filter chamber and at least one filter cloth arranged therein, and in which the filter plates are able to be spaced apart from each other up to an emptying distance in a discharge position, further comprising at least one filling element for supplying suspension to the filter chamber being associated with each filter chamber, characterized in that the filling element (2) is arranged on a joining piece (5) extending outside a plate face of the filter plates and inside a sealing edge (27) surrounding said filter plates (1M, 1K), said filling element (2) being connected with a first one of the filter plates (1M), with said filling elements (2) forming in the filtration position a suspension inlet channel (22) extending through the package of the filter plates (1M, 1K) and being sealingly clamped between the two adjacent filter plates (1M, 1K), and further characterized in that a receiving bore (8M) for receiving the filling element (2) in the first filter plate (1M) is provided with a groove (10) that faces a groove (11) in said filling element (2) in an inserted state of said filling element inserted in said receiving bore, with a sealing ring (12) projecting into both of said grooves (10, 11) which positively connects said filling element (2) with said first filter plate (1M).

2. The filter plate arrangement according to claim 1, comprising a respective said filling element (2) on each of two opposite sides of the first filter plate, with said filling element (2) sealingly penetrating the filter cloth (7M) on one of said sides of the first filter plate, which is a diaphragm filter plate having an expandable pressing diaphragm arranged thereon.

3. The filter plate arrangement according to claim 1, characterized in that the filling element (2) consists of ac cylindrical central part (9) forming the inlet channel (22) and a flange part (13) extending at a right angle to a longitudinal axis (14) of the central part, with said flange part (13) being provided with branching channels (15) extending radially from said inlet channel (22) and leading to the filter chamber (23).

4. The filter plate arrangement according to claim 3, characterized in that the flange part (13) engages at least partially in a recess (19) in the first filter plate (1M) to which it is connected.

5. The filter plate arrangement according to claim 3, characterized in that the flange part (13) engages at least partially in a recess (20) in a second one of the filter plates (1K) adjacent to said first filter plate (1M) to which said filling element (2) is connected.

6. The filter plate arrangement according to claim 3, further comprising an expandable pressing diaphragm arranged on a side of the first filter plate, characterized in that a front side (24) of said flange part (13) facing said filter chamber (23) is inclined at an acute slope overhanging said filter chamber as to steadily support the diaphragm (6) in its expanded state.

7. The filter plate arrangement according to claim 3, characterized in that a second one of the filter plates (1K) to which said filling element (2) is not connected is provided with a groove (17) surrounding a passage bore (8K) therethrough, in which groove (17) a sealing ring (18) is inserted, against which the flange part (13) is pressed in the filtration position.

8. The filter plate arrangement according to claim 3, further comprising an expandable pressing diaphragm arranged on a side of the first filter plate, characterized in that the central part (9) of the filling element (2) is located outside the diaphragm (6) and that a second one of the filter plates (1K) is provided with a sleeve (33) surrounding a passage bore (8K) therethrough, with said sleeve (33) being elastically compressed by the flange part (13) of the filling element (2) in the filtration position of the plate package.

9. The filter plate arrangement according to claim 8, characterized in that a sealing bead (29) of the diaphragm (6) is elastically compressed by the flange part (13) of the filling element (2) in the filtration position of the plate package.

* * * * *

UNITED STATES PATENT AND TRADEMARK OFFICE
CERTIFICATE OF CORRECTION

PATENT NO. : 6,852,220 B1
DATED : February 8, 2005
INVENTOR(S) : Grafen et al.

It is certified that error appears in the above-identified patent and that said Letters Patent is hereby corrected as shown below:

Column 7,
Line 8, after "suspensions", insert -- , --;
Line 42, after "of", replace "ac" by -- a --.

Signed and Sealed this

Seventeenth Day of May, 2005

JON W. DUDAS
*Director of the United States Patent and Trademark Office*